(12) United States Patent
Fujino et al.

(10) Patent No.: US 6,830,424 B2
(45) Date of Patent: Dec. 14, 2004

(54) APPARATUS AND METHOD FOR SEPARATING AND SUPPLYING PLATES FROM A STACKED PLATE ASSEMBLY

(75) Inventors: Takayuki Fujino, Fukushima (JP); Shun-ichi Izawa, Kanagawa (JP)

(73) Assignees: The Furukawa Battery Co., Ltd., Yokohama (JP); Iken Mfg. Co., Ltd., Yokohama (JP)

( * ) Notice: Subject to any disclaimer, the term of this patent is extended or adjusted under 35 U.S.C. 154(b) by 203 days.

(21) Appl. No.: 10/183,041

(22) Filed: Jun. 27, 2002

(65) Prior Publication Data

US 2003/0012636 A1 Jan. 16, 2003

(30) Foreign Application Priority Data

Jun. 28, 2001 (JP) ....................................... 2001-196245

(51) Int. Cl.[7] .............................................. B65G 59/04
(52) U.S. Cl. ...................................... 414/797; 414/801
(58) Field of Search .......................... 414/795.8, 796.7, 414/797, 801, 802; 198/408, 471.1

(56) References Cited

U.S. PATENT DOCUMENTS 6,030,171 A * 2/2000 Johnson et al. ............. 414/797

FOREIGN PATENT DOCUMENTS

| JP | 42-3210 | 2/1942 |
|---|---|---|
| JP | 4-286515 | 10/1992 |

* cited by examiner

*Primary Examiner*—Donald W. Underwood
(74) *Attorney, Agent, or Firm*—Armstrong, Kratz, Quintos, Hanson & Brooks, LLP

(57) ABSTRACT

This invention provides an apparatus for separating and supplying plates from a stacked plate assembly capable of highly efficiently separating and conveying one plate by one from a stacked plate assembly of a storage cell without interruption and conveying and supplementing, one by one, the separated plate to a next step with improved reliability. In this apparatus, separation suction disks (6) for sucking, separating and holding the uppermost plate P are arranged on a support table (2) at an upper end portion of an elevation rod (1a) of an elevation mechanism (1) above a stacked plate assembly (A1) for separation having a large number of plates stacked in such a fashion as to be capable of moving up and down also included are rotary bodies (13) each having rotary suction disks (12) arranged along a circumference with predetermined gaps. A suction releasing mechanism (25) is contained for sucking and removing a separated plate P' sucked and held by the separation suction disk 6 and a suction releasing mechanism (25) for cutting off the sucking operation and releasing the separated plate P' for each rotary suction disk (12). A conveying-supplying mechanism (19) conveys and supplies the separated plate P' released from the rotary disk (12) for further processing.

4 Claims, 7 Drawing Sheets

APPARATUS AND METHOD FOR SEPARATING AND SUPPLYING PLATES FROM A STACKED PLATE ASSEMBLY

BACKGROUND OF THE INVENTION

1. Field of the Invention

This invention relates to an apparatus, and a method, for separating and supplying plates from a stacked plate assembly used in a production process for storage cells such as a lead storage cell.

2. Description of Related Art

A plate separating-supplying apparatus of plates from a stacked plate assembly used for separating plates one by one from a stacked assembly of a large number of negative or positive plates contains a number of steps. In a pre-stage process step of a so-called "cell element stacking step," an example for alternately stacking negative plates, positive plates and separators as cell elements of a storage cell, and supplying the plates to the next cell element stacking step is described in Japanese Patent Publication No. 3210/1967. In the apparatus of this reference, a stand is placed on a plate feed chain and a number of plates are rested against the slope of the front surface of the stand while slightly inclined from an erected state, and are gradually conveyed forth as a stacked plate assembly under such an inclined state. However, a suction device so arranged as to face the plates at the same angle of inclination as that of the plate rocks, sucks and holds the plate at the foremost position. When the suction device passes through a stopper, the plate comes off from the stopper and falls down to an intermediate receiver below the stopper. As this operation is repeated, the plates are separated one by one from the stacked plate assembly.

Besides the rocking type suction device described above, a rotary suction device is also known. This suction device uses suction disks on a peripheral surface of a vacuum drum and each suction disk rotates with the rotation of the vacuum drum and sucks and holds, one by one, the foremost plate on an erected or inclined state. The plate drops to a plate conveyor belt below the vacuum drum and is supplied to a next step.

Japanese Patent Laid-Open No. 286515/1992 describes a plate conveyor apparatus having a construction in which suction disks are arranged on a rotary belt, each suction disk facing down sucks and holds one after another. The uppermost plate of a sacked plate assembly having a large number of plates stacked under a horizontal state while the rotary belt is rotated, and the vacuum is released when the rotary belt rotates to a predetermined position.

In the apparatus disclosed in Japanese Patent Publication No. 3210/1967 described above, it is not easy to convey a large number of plates of the stacked plate assembly having them stacked under the inclined state while constantly keeping the same angle of inclination as that of the stand. Therefore, the angle of inclination of the foremost plate that is sucked by the suction device having a predetermined angle of inclination does not remain constant, and a difference from an angle of inclination of the suction device occurs frequently. Therefore, the foremost plate cannot be stably sucked one by one, so that the separating operation lacks reliability. Because the plate sucked and held by the suction device is brought into contact with the stopper and is then dropped, fall-off and damage of the active material of the plate are likely to occur.

In the rotary suction device also described above, the suction disks are continuously brought into contact with the opposing plates and sucked and held them while the vacuum drum is being rotated when they are provided to the peripheral surface of the vacuum drum. Therefore, the suction disks travel in an arcuate form and instantaneously come into contact with the plane of the plates and must suck and hold the plates at that instant. For this reason, the sucking and holding operation is difficult to attain and the rotating speed of the vacuum drum must be remarkably lowered. Alternatively, it is necessary to intermittently rotate the vacuum drum so that the sucking and holding operation can be made when the rotation stops. In either case, the number of plates separated per minute by the sucking and holding operation, or a so-called "shot number", remarkably drops.

This also holds true of the plate conveying apparatus described in Japanese Patent Laid-Open No. 286515/1992 described above. It is difficult for the suction disks to suck and hold the upper surface of the uppermost plate of the stacked plate assembly with the plates stacked horizontally while a rotary belt is rotated, and the suction disks must be brought into pressure contact with the plate at the stop of the rotary belt that is intermittently rotated. Consequently, operation efficiency of sucking and separating the plates one by one from the stacked plate assembly unavoidably drops.

As described above, the prior art technologies cannot yet suck and separate reliably and at a high speed the plates one by one from the stacked plate assembly and cannot either transfer stably and satisfactorily the plates to a next process step. Therefore, these technologies are extremely unreliable, unstable and inefficient.

To carry out the continuous operation, using the apparatus of Japanese Patent Publication No. 3210/1967, a high level of skill is necessary for removing the stand while keeping the stacked plate assembly under the predetermined inclination state and then supplementing a new stacked plate assembly. In other words, this operation essentially relies on the level of skill of the operator.

Therefore, an apparatus of the kind described above has been desired that can eliminate these problems of the prior art technologies, can reliably separate one by one and at a high speed the plates from the stacked plate assembly and can supply them to the next process step.

An apparatus of the kind described above has also been desired that does not call for the skill of the operator, but can smoothly and satisfactorily supplement new plate stacked plate assemblies one after another without stopping the mechanical separating operation of the plates from the stacked plate assembly and can carry out this operation smoothly and highly efficiently.

SUMMARY OF THE INVENTION

The invention is an apparatus for separating and supplying plates from a stacked plate assembly. This apparatus can solve the problems of the prior art technologies described above, can satisfy the requirements also described above this apparatus can automatically carry out a highly efficient operation, reliably separating one plate by one even in a high-speed operation. The apparatus, according to the invention, comprises an elevation mechanism having a support table for supporting a stacked plate assembly for separation having a large number of plates stacked in a horizontal state from a lower surface. Separation suction disks are arranged above the elevation mechanism for sucking and holding the uppermost plate of the stacked plate assembly for separation supported by the support table of the elevation mechanism. A separation mechanism for moving up and down a blast rod having the separation suction disks is used. Rotary bodies positioned on the side of the separation suction disks and having rotary suctions disks arranged on a circumference with predetermined gaps are also used. A suction release mechanism for imparting a sucking operation for sucking and removing a separated plate from the separation suction disks and a releasing operation for cutting off the suction operation and releasing the separated plate through blast holes formed in the rotary bodies operates. A conveying-supplying mechanism for conveying and supplying the separated plate so released to a next step is used.

The invention further provides a plate separation-supplying apparatus for a stacked plate assembly that can mechanically supplement new stacked plate assemblies without interrupting the stable and high efficient separating-supplying operation of the stacked plate assembly described above. Further, it can continuously conduct this operation without calling for the skills of an operator. This apparatus further comprises a supplementing-conveying mechanism for conveying a standby stacked plate assembly having a large number of plates stacked in a horizontal state to a position of the support table of the elevation mechanism that is lowered. A relay-reciprocating mechanism is used for moving back and forth horizontal reception members for supporting a residual stacked plate assembly from a lower surface when the number of residual plates of the stacked plate assembly for separation becomes small. Further, disposed on the side of the stacked plate assembly for separation supported on the support table of the elevation mechanism is a relay-elevating mechanism for moving up and down the relay-reciprocating mechanism. The horizontal reception members are allowed to advance and to support the residual stacked plate assembly from the lower surface at a stage where the number of the residual stacked plates of the stacked plate assembly for separation becomes small. In the interim, the support table of the elevation mechanism is once lowered below a conveyor belt of the supplementing-conveying mechanism, is again moved up to support a stacked plate assembly for supplementation supplemented by the supplementing-conveying mechanism above the support table, and is further moved up to join with the lower surface of the residual stacked plate assembly.

The invention further provides a method for separating and supplying plates from a stacked plate assembly. This method comprises the steps of sucking and separating upwards plates of a stacked plate assembly having a large number of plates laminated under a horizontal state from the uppermost plate. It then sucks and removes the plate so separated by way of suction disks. Thereafter, it releases the plate from the suction disks and conveys and supplies the plate to a next step.

Furthermore, the invention provides a method for separating and supplying plates from a stacked plate assembly. This method can carry out the plate separating operation described above without interruption, wherein a new stacked plate assembly for separation is supplemented from below the stacked plate assembly when the number of residual plates of the stacked plate assembly for separation becomes small.

DESCRIPTION OF THE PREFERRED EMBODIMENTS

Next, modes for carrying out the invention will be explained in detail with reference to embodiments thereof shown in the accompanying drawings.

First, an embodiment of the invention will be explained about an apparatus for efficiently separating one by one positive or negative plates from a stacked plate assembly and supplying them one by one to a next step.

Figure 1:
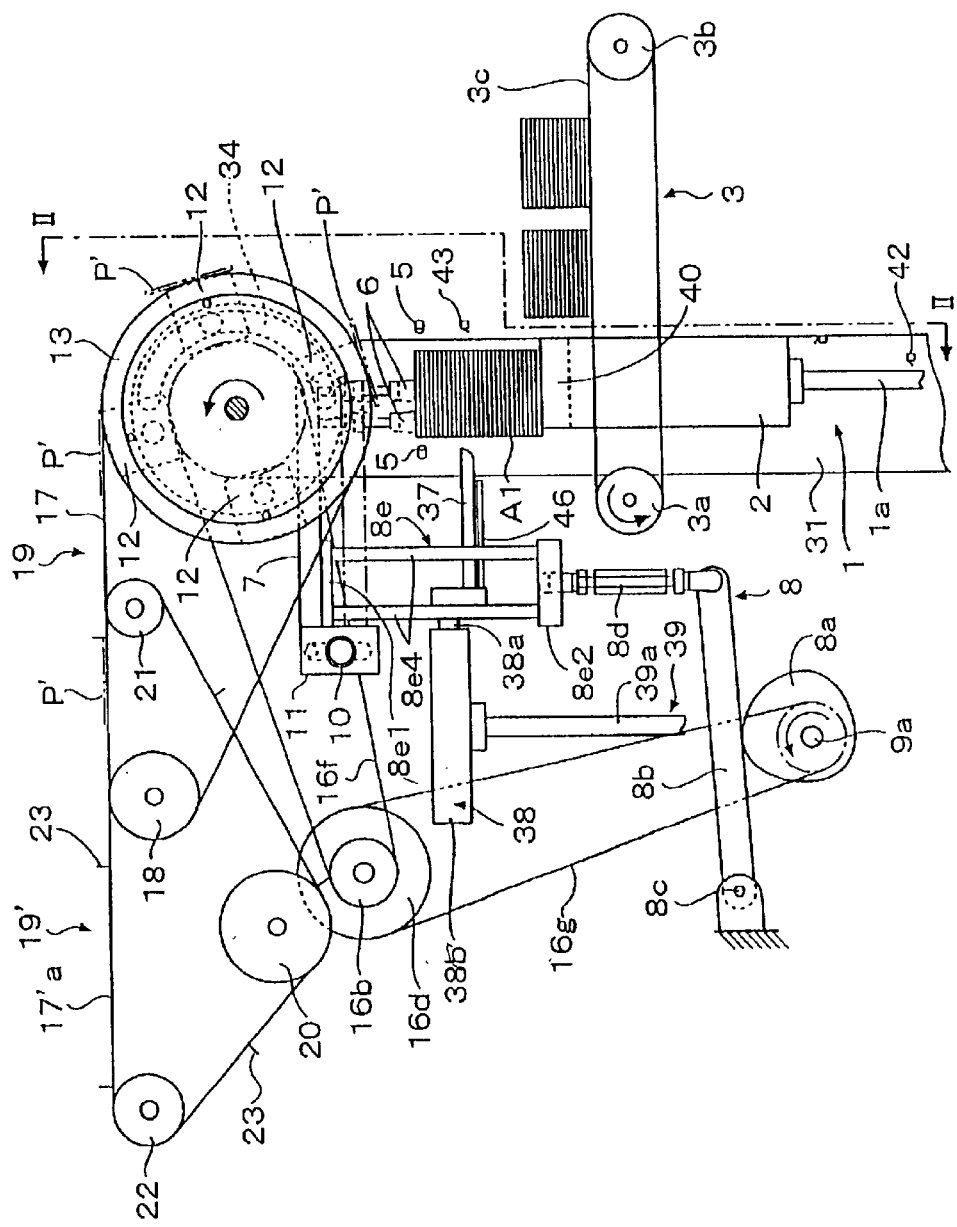
FIG. 1 is a partially cut-away side view of an apparatus according to Embodiment 1 of the invention.
Figure 2:
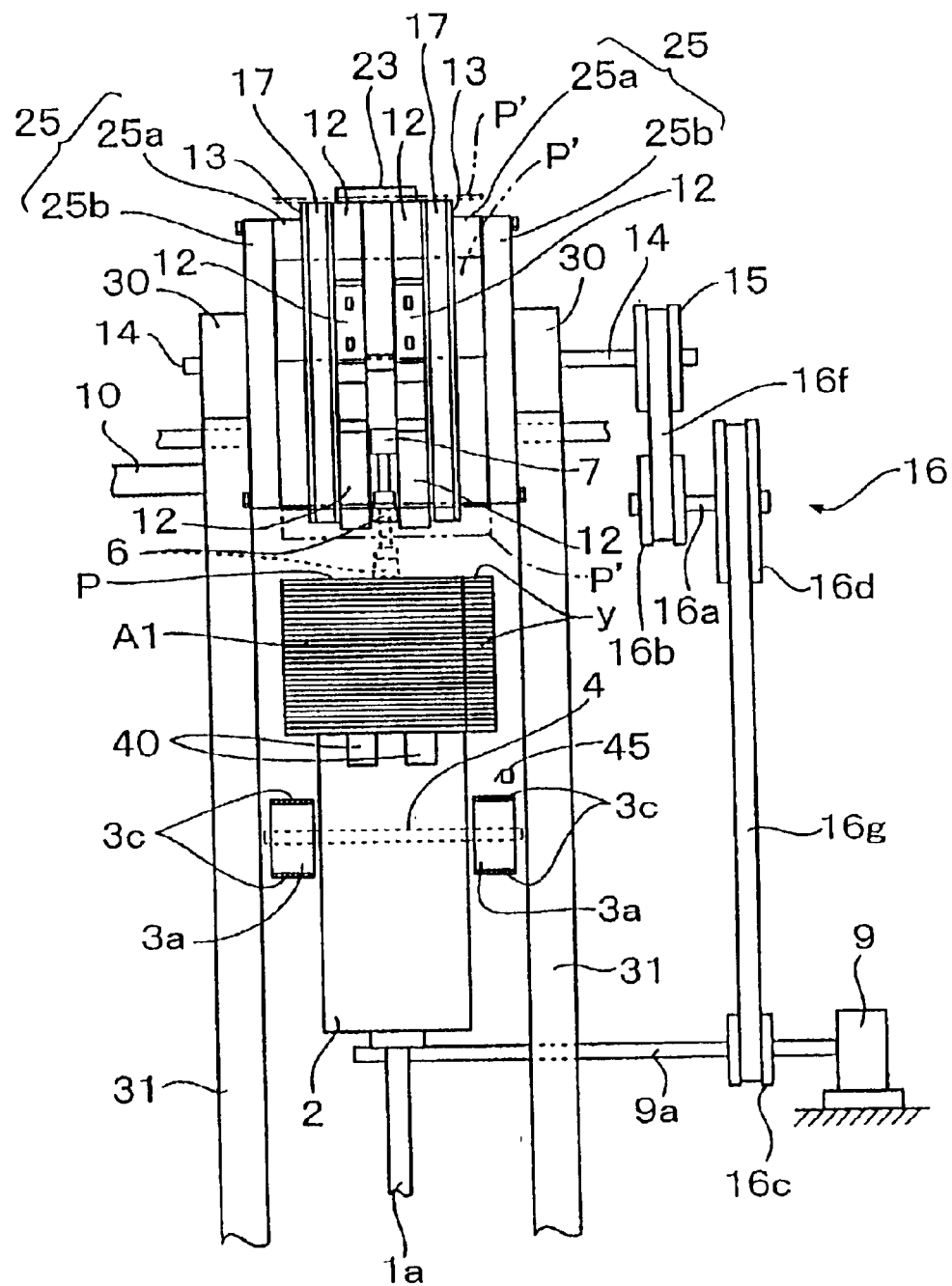
FIG. 2 is a view of the apparatus of the invention taken along a line II—II indicated by arrows in FIG. 1.

FIG. 1 is a partially cut-away front view of the apparatus of this embodiment and FIG. 2 is a side view taken along a line II—II of FIG. 1.

In the drawing, reference numeral 1 denotes an elevation mechanism including a stepping motor (not shown) installed on a floor and an elevation rod 1a extending vertically upward from the stepping motor. A prismatic support table 2 is fitted to the upper end of the elevation rod 1a. The support table 2 can move up and down inside a space 4 defined between a pair of right and left endless annular plate conveyor belts 3c and 3c wound on a pair of right and left belt wheels 3a, 3a, and 3b, 3b that are arranged both in front and rear of a supplementation/conveying apparatus 3 installed transversely. While the support table 2 is positioned below the conveyor belts 3c, 3c, a stacked plate assembly A1 for separation including a desired number of positive or negative plates (hereinafter merely called"plates") so stacked in a horizontal posture as to bridge between the plate conveyor belts 3c, 3c is conveyed to and positioned above the support table 2. Next, the elevation rod 1a is moved up in such a fashion as to support from below and push up the stacked plate assembly A1 for separation on the support table 2 until the uppermost plate P of the stacked plate assembly A1 reaches a predetermined height as shown in FIG. 1. This height is the level at which the uppermost plate P cuts off rays of light from a pair of optical sensors 5 opposing each other.

Above the elevation mechanism 1 is disposed a separation mechanism 8 that includes a separation suction disk 6 and a blast rod 7 in a horizontal posture having the separation suction disk 6 and connected to a vacuum means (not shown) at a position suitable for coming into close contact with the upper surface of the plate P of the stacked plate assembly A1 when they move down. The separation mechanism 8 drives up and down the separation suction disk 6 through the blast rod 7. The separation mechanism 8 includes a cain 8a fixed to a rotary shaft 9a of a motor 9, an arm 8b having one of its ends pivotally connected to the a pivot portion 8c, coming into contact with the cam 8a at its intermediate portion and rocking up and down with the pivot portion 8c as a support point with the rotation of the cam 8a. Further, a vertical connection rod 8d having a lower end thereof connected to the other end of the arm 8b, and a frame-like connection portion 8e is connected to the upper end of the connection rod 8d. The separation mechanism 8 is thus interconnected to the lower surface of the proximal end portion of the blast rod 7 extending horizontally through these members. When the motor 9 is driven, the arm 8b rocks up and down with the rotation of the cam 8a, and the horizontal blast rod 7 is moved up and down through the vertical connection rod 8d and the frame-like connection portion 8e. In consequence, the separation suction disk 6 so fitted to the distal end portion of the blast rod 7 as to face downward is allowed to move up and down and to come into, and away from, the upper surface of the uppermost plate P of the stacked plate assembly A1. The separation suction disk 6 sucks the uppermost plate P when it moves down and separates the plate P from the stacked plate assembly A1 when it moves up. As shown in the drawing, two separation suction disks 6 are arranged in both front and rear to ensure stable suction and separation of the plate P though only one separation suction disk 6 may well be used. By the way, this separation suction disk 6 includes a tubular portion 6a extending vertically downward, communicating with the blast passage 7a of the blast rod 7 and penetrating through its lower wall, and a trumpet-shaped suction disk main body 6b made of a flexible rubber and bonded to the distal end of the tubular portion 6a.

In the drawing, symbol y represents an ear of the plate.

The frame-like connection portion 8e includes a rectangular upper plate portion 8e1 fixed to the lower surface of the horizontal blast rod 7 and extending horizontally to the right and left while crossing the horizontal blast rod 7, a rectangular lower plate portion 8e2 connected to the upper end portion of the connection rod 8d and extending to the right and left in parallel with the upper plate portion 8e1 and front and rear vertical rods 8e3 and 8e3, and 8e4 and 8e4 respectively forming pairs in the transverse direction and connecting the upper and lower plates 8e1 and 8e2.

An open portion 7b at the proximal end portion of the blast passage 7a inside the blast rod 7 is connected to an exhaust vacuum device (not shown) such as a vacuum pump through the suction pipe 10 so that the suction operation is imparted to the separation suction disk 6 at the distal end portion of the blast rod 7 when the vacuum pump operates.

In this case, a connection means for the blast rod 7 and the suction pipe 10 is such that when the blast rod 7 moves up and down, the open portion 7b always keeps connection with the suction pipe 10 and hence the suction operation by the exhaust vacuum operation of the vacuum pump is always imparted to the separation suction disk 6 at the distal end portion of the blast rod 7. Alternatively, the connection means may well be such that connection with the suction pipe 10 is cut off when the blast rod 7 exists at the up movement position and hence, the suction operation by the vacuum pump is cut off when the separation suction disk 6 exists at the up movement position. In the example shown in the drawing, connection with the suction pipe 10 is always kept and the suction operation by the vacuum pump is always imparted to the separation suction disk 6, when the blast rod 7 moves up and down.

In other words, an open portion 7b is defined on one of the sidewalls of the blast rod 7 having a square section. On the other hand, the distal end of the suction pipe 10 is fitted to a cylindrical portion 11a so formed on the rear surface wall of the box-shaped longitudinal intermediate connection member 11 as to protrude therefrom, and the front surface wall is brought into sliding contact with the sidewall surface on which the open portion 7b opens. A longitudinal open portion 11b is aligned with the open portion 7b of the blast rod 7 in such a fashion as to cover the range of the front surface wall in which the blast rod 7 moves up and down.

When the blast rod 7 moves up and down, the open portion 7b always keeps the connection state with the longitudinal open portion 11b of the box-shaped intermediate connection member 11. Accordingly, the suction operation is always imparted during the up/down movement of the separation suction disk 6 while the vacuum pump operates. Incidentally, it is also possible to employ the arrangement in which the open portion 7b of the blast rod 7 is a cylindrical open portion and the distal end portion of the suction pipe 10 is directly fitted to the open portion 7b so that the suction operation can be always imparted to the separation suction disk 6. According to this arrangement, however, the suction pipe 10, also moves up and down with the up/down movement of the blast rod 7. Therefore, it is more advantageous to employ the construction described above in which the intermediate connection member 11 is interposed and the suction pipe 10 can be kept under the stable settling state without being affected by the up/down movement of the blast rod 7. Also, a design change may be made in place of the longitudinal open portion 11b of the box-shaped intermediate connection member 11 so that the suction operation is imparted to the separation suction disk 6 at the down movement position only when the blast rod 7 moves down, but when the blast rod 7 exists at the up movement position, the connection of the open portion 7b with the longitudinal box-shaped intermediate connection member. Thus, with the suction pipe 10 is cut off, the suction operation of the separation suction disk 6 at the up movement position is also cut off. It is further possible to employ the arrangement in which the open portion 7b communicates with external air when the blast rod 7 exists at the up movement position, and communicates with the suction pipe 10 and is imparted with the suction operation only when it exists at the down movement position.

According to the invention, at least one rotary body 13 having a plurality of box-shaped rotary suction disks 12, 12, equidistantly disposed on its peripheral surface is further arranged at a position adjacent to the separation suction disk 6 described above. In the example shown in the drawing, four box-shaped rotary suction disks 12, 12, 12, and 12 are arranged adjacent to one another on both sides of the front and rear separation suction disks 6 and 6 described above. A pair of rotary bodies 13 and 13 is so arranged as to oppose each other. These rotary bodies 13 and 13 are fixed onto a rotary shaft 14 that extends while crossing the blast rod 7, at positions of a predetermined height immediately above the separation suction disks 6 and 6 of the blast rod 7, and are rotated counter-clockwise with the rotation of a belt wheel 15 fixed to one of the ends of the rotary shaft 14 as shown in FIG. 1. As clearly shown in FIG. 2, the belt wheel 15 is connected to the motor 9 through an intermediate conduction device 16.

The conduction device 16 includes a rotary shaft 16a disposed at the back of the belt wheel 15 and extending horizontally, thereto. A guide pulley 16b is disposed inside the rotary shaft 16a to oppose the belt wheel 15. A guide pulley 16d is disposed outside the guide pulley 16b and opposing the guide pulley 16c fixed to the rotary shaft 9a of the motor 9. An endless annular belt 16f is wound between the belt wheel 15 and the guide pulley 16b and an endless annular belt 16g is wound between the guide pulley 16d and the guide pulley 16c. When the motor 9 operates, the belt wheel 15 is rotated through the conduction device 16, and a pair of rotary bodies 13 and 13 fixed to the rotary shaft 14 is rotated. At the same time, the cam 8a fixed to the rotary shaft 9a of the motor 9 is rotated, too. Consequently, the blast rod 7 moves up and down through the plate separation mechanism 8 and hence the separation suction disks 6 and 6 move up and down.

Figure 3:
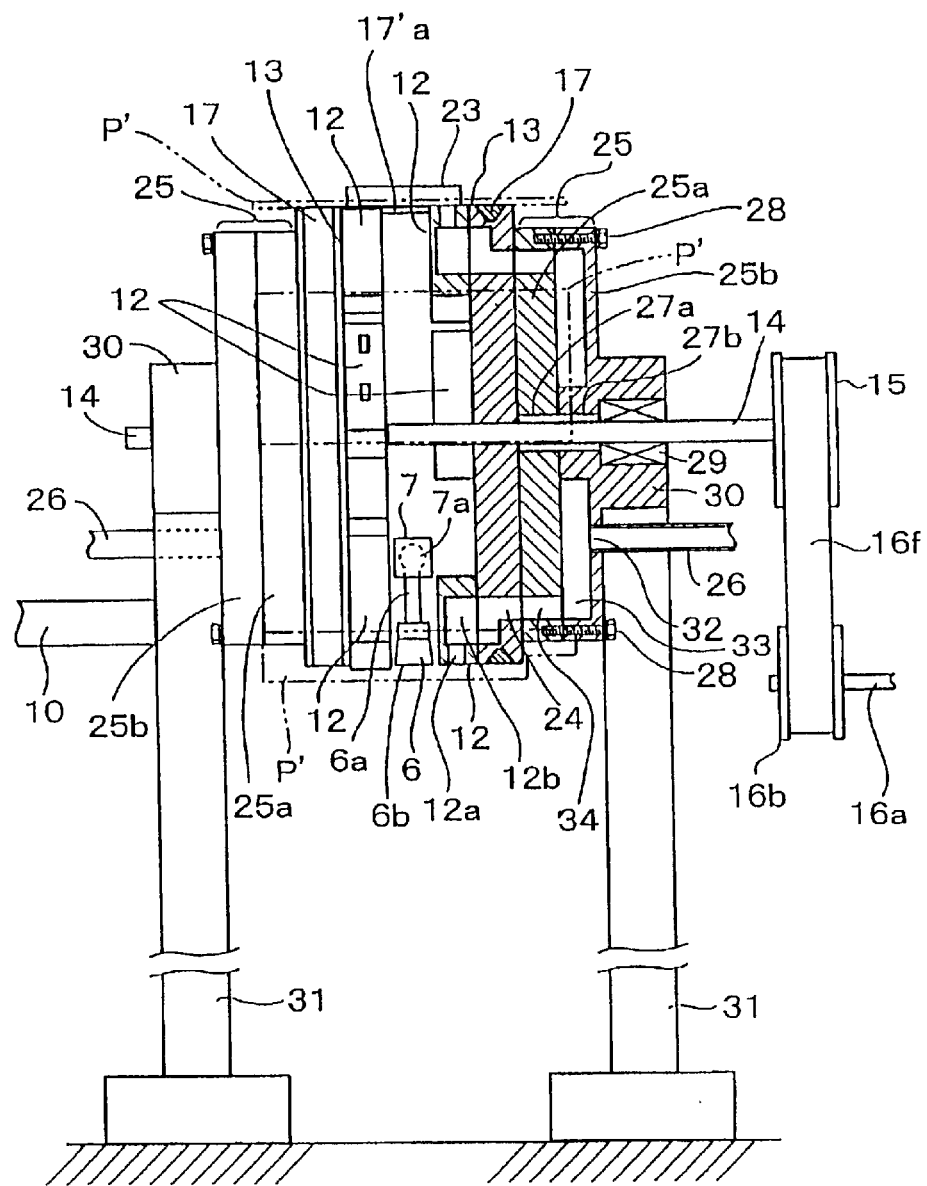
FIG. 3 is a central semi-cut enlarged view of a half of right and left rotary bodies and a suction/releasing mechanism in FIG. 2.
Figure 4:
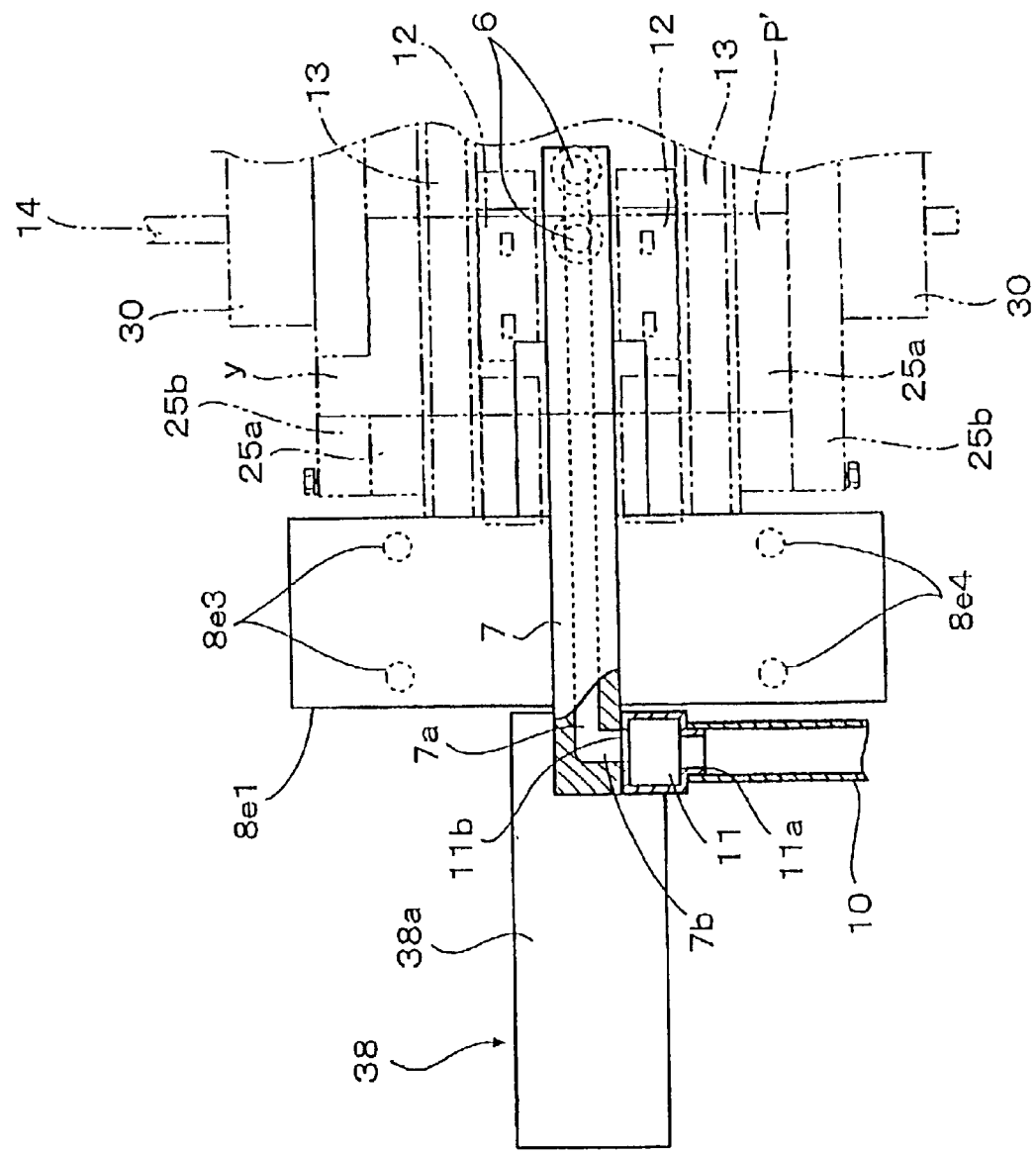
FIG. 4 is a partially cut-away top view with a connection mechanism between a blast pipe and a suction pipe equipped with a separation suction disk shown in FIG. 1 as the center.
Figure 5:
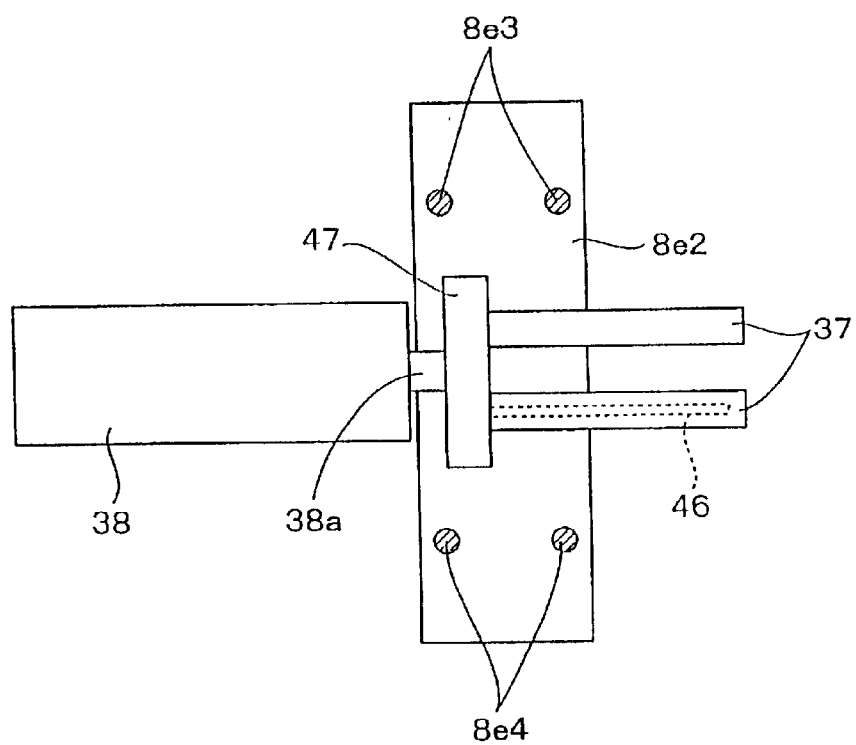
FIG. 5 is a top view of a relay-reciprocating mechanism of the apparatus shown in FIG. 1.

The installation positions of the rotary bodies 13, 13 so arranged as to form a pair on the right and left sides are determined in the following way. As shown by a semi-cut cross sectional view in FIG. 3, the lowermost positions of the respective circumferential surfaces exist at their up movement positions a little above the lower surfaces of the suction disk main bodies 6b and 6b of the separation suction disks 6 and 6. Further, when the box-shaped rotary suction disks 12, 12, . . . provided to these rotary bodies 13 and 13 come to the lowermost positions due to their rotation, the suction port 12a provided on the outer end wall of each rotation suction disk 12 exists a little below the lower surface of the suction disk main bodies 6b and 6b of the separation suction disks 6 and 6 that exist at the up movement position. During the up movement of the separation suction disks 6 and 6, the separated plate P' sucked and held by the separation disks 6 and 6 comes into contact with the outer end wall surfaces of the pair of right and left rotation suction disks 12 and 12 that come to the lowermost positions due to the rotations of the pair of rotary bodies 13 and 13, and the pairs of suction ports 12a, 12a and 12a, 12a stably suck and hold the separated plate p'. As the rotary disks 12 and 12 further rotate, the separated plate P' is transferred from the separation suction disks 6 and 6 to the rotary bodies 13 and 13 and is rotated and conveyed.

As will be later described, a suction releasing mechanism driven by a separate vacuum pump alternately imparts the suction operation and the suction releasing operation to the rotary suction disks 12 and 12 with the revolution of the rotary bodies 13 and 13. When the suction force acts on the separation suction disks 6 and 6, the suction force acting on the rotary suction disks 12 and 12, that is, the degree of vacuum, is preferably greater than the suction force acting on the separation suction disks 6 and 6, that is, the degree of vacuum. Accordingly, the separated plates P' adsorbed by the separation suction disks 6 and 6 can be transferred smoothly and reliably to the pair of rotary suction disks 12 and 12.

When the pair of rotary suction disks 12 and 12 come to the lowermost end positions adjacent to both sides of the pair of separation suction disks 6 and 6 at the up movement position with the revolution of the rotary bodies 13 and 13, the separated plate P' so sucked and held by the suction disks 6, 6 is sucked and transferred from the separation suction disks 6 and 6 to the rotary suction disks 12 and 12, and is then rotated and conveyed by the subsequent revolution of the rotary bodies 13 and 13. When the rotary suction disks 12 and 12 come to the upper most end position of the rotary bodies 13 and 13, the suction operation is released to release the separated plate P' that is sucked and held. The separated plate P' so released is conveyed and supplied by a later-appearing conveying mechanism to the subsequent process step.

In the embodiment shown in the drawing, the plate conveying/supplying mechanism 19 has the following construction. The pair of rotary bodies 13 and 13 are belt wheels, and in the V-shaped grooves of the belt wheels, the V belts 17 and 17 departing from the rotary bodies 13 and 13 are endlessly wound in the horizontal posture between the pair of guide pulleys 18, 18 arranged to oppose the pair of rotary bodies 13 and 13 in such a fashion that the V belts 17 and 17 exist substantially on the same outer peripheral surface of the belt wheels as clearly shown in FIG. 3.

Preferably, an additional conveying-supplying mechanism 19' is disposed in the space between the pair of guide pulleys 18 and 18 in such a fashion as to further extend the conveying/supplying path.

In other words, a conveyor belt 17'a is wound endlessly and annularly on the driving pulley 20 connected to the driving motor (not shown) and the guide pulleys 21 and 22 arranged in both front and rear of the driving pulley 20 and is partially fitted into the space. In this instance, the belt portion 17'a in the conveying direction exists on the same level as the right and left conveyor belts 17 and 17 so as to extend the additional conveying/supplying mechanism 19'. Incidentally, anchor pawls 23 may be arranged with predetermined gaps on the outer circumferential surface of this conveyor belt 17'a to anchor and convey one by one the separated plates P' as shown in the drawing.

When the motor 9 operates, the up/down movement of the separation suction disks 6 and 6 and the revolution of the rotary bodies 13 and 13 are simultaneously made. Needless to say, the stroke of the up/down movement of the separation suction disks 6 and 6, the rotating speed of the rotary bodies 13 and 13 and the number of rotary suction disks 12 arranged on the circumference and their gap are set in advance so that when the separation suction disks 6 and 6 come to the up movement position from the down movement position, each part of rotation suction disks 12 and 12 of the rotary bodies 13 and 13 come to the lowermost position of the rotary bodies 13 and 13, that is, to the adjacent positions aligned on both sides of the separation suction disks 6 and 6.

In the embodiment shown in the drawings, four rotary suction disks 12 are provided with predetermined gaps to each rotary body 13, and the rotating speeds of the rotary bodies 13 and 13 are brought into conformity with one another through the motor 9 and the conduction device 16 so that when the separation suction disks 6 and 6 come to the up movement position, each rotary suction disk 12 comes to the lowermost position and adjacent to each separation suction disk 6 and 6 and in match with the stroke of the up/down movement of the separation suction disk 6 and 6 generated by the plate separation mechanism 8.

The internal blast passage 12b of each of the four rotation suction disks 12 to 12 arranged on the inner peripheral surface of the pair of rotary bodies 13 and 13 communicates with the blast port 24 formed in each rotary body 13 and 13 and is connected to the suction releasing mechanism 25 and 25 of the rotary body 13 and 13 through the blast port 24. Each suction releasing mechanism 25 and 25 is connected to the exhaust vacuum device (not shown) such as the vacuum pump through the suction pipe 26 that is led out. In this way, each suction releasing mechanism 25 and 25 has the suction operation for sucking and taking the separated plate P' from the separation suction disks 6 and 6 through the blast port 24 and 24 formed in each rotary body 13 and 13 of each rotary suction disk 12 with the revolution of the rotary body 13 and 13, and the release operation for cutting off the suction operating and releasing the separated plate.

Since the right and left suction releasing mechanisms 25 and 25 have the same construction, the explanation will be given in detail on one of the suction releasing mechanisms 25.

As shown in the drawings, each suction releasing mechanism 25 has two, thick, inner and outer disk bodies 25a and 25b. Each of these disk bodies 25a and 25b has at its center a through-hole 27a, 27b having a greater diameter than that of the rotary shaft 14 of the belt wheel 15, and is shaped into a desired shape and size such as a circle or a rectangle. In the embodiment shown in the drawings, the disk bodies 25a and 25b are circular, have a diameter somewhat smaller than that of the rotary body 13, and are fixed on their opposing surfaces by a screw 28. As clearly shown in FIG. 3, the through-holes 27a and 27b at the center have annular gaps from the rotary shaft 14 and the inner circumferential surface of the inner disk body 25a is brought into sliding contact with the outer surface of the rotary body 13. Incidentally, the outer disk body 25b integrally has a cylindrical protrusive bearing 30 between its outer surface and the rotary shaft through a bearing 29, and is fixed and supported by a pair of front and rear support poles 31 on the outer circumferential surface of the bearing 30. In the embodiment shown in the drawings, the suction pipe 26 led out from the external vacuum pump (not shown) is connected to an open portion 32 opening on the outer surface of the outer disk body 25b. An annular blast groove 33 is formed throughout the entire circumference of the inner surface of the disk body 25b and communicates with the open portion 32. A semi-arc blast through-hole 34 is bored in the inner and outer disk bodies 25a to extend from the upper end portion to the lower end portion. The suction releasing mechanism 25 is thus constituted.

Each rotary suction disk 12 is fixed to the inner peripheral surface of the corresponding rotary body 13 either by an adhesive or by the screw as shown in the drawing while keeping communication with each blast port 24.

When the vacuum pump operates and the right and left rotary bodies 13 and 13 rotate, the rotary suction disk 12 provided to each rotary body 13 adsorbs and separates the plate P from the stacked plate assembly A1 for separation, rotates half way while stably sucking and holding the separated plate P' and conveys the plate P' till it rotates half way from the lowermost position to the uppermost position because the suction operation of the exhaust vacuum, that is, the suction force, is imparted to the suction ports 12a and 12a of the rotary suction bodies 12 and 12 through the suction pipes 26 and 26, the open portions 32 and 32 of the outer disk bodies 25a and 25b, the blast annular grooves 33 and 33, the semi-arc blast through-holes 34 and 34 of the inner disk body 25a communicating with the blast annular grooves 33 and 33 and the blast passages 12b and 12b provided to the rotary suction disks 12 and 12 of the semi-arc blast through-holes 34 and 34 communicating with them. As the rotary bodies 13 and 13 further rotates and the pair of rotary suction disks 12 and 12 exceed the uppermost positions, the inner blast passages 12b and 12b of these rotary suction disks 12 and 12 face the semi-arc hole-free sheet surface of the semi-arc blast through-holes 34 and 34 of the inner disk body 25a. Since the suction operation is cut off in this case, suction and holding of the separated plate P' by the rotary suction disks 12 and 12 are released. The separated plate P' is released from the rotary suction disk 12, and is transferred to the pair of conveyor belts 17 and 17 constituting the conveying-supplying mechanism 19 with further rotation of the rotary bodies 13 and 13 as shown in the drawing. The conveyor belts 17 and 17 further convey the separated plate P' in the direction indicated by the arrow and the conveyor belt 17' of the additional conveying-supplying mechanism 19' conveys and supplies the plate P' to the next process step under the anchor state by the pawls 23.

As the pair of rotary bodies 13 and 13 rotate and the separation disks 6 and 6 move up and down through the pair of rotary suction disks 12 and 12, the uppermost plate P of the stacked plate assembly A1 for separation is sucked and removed by the separation suction disks 6 and 6 repeating the up/down movement in a predetermined stroke. The plate P that becomes next the uppermost plate is sucked and removed by the separation suction disks 6 and 6. To achieve this operation, the optical sensors 5 and 5 are arranged at the predetermined height on the sides of the stacked plate assembly A1. Since the rays of light of these sensors 5 and 5 are cut off whenever the plate P at the uppermost position is removed through the space occurring at the removal position, the optical sensors 5 operate and their signals are transmitted to the elevation mechanism 1. When the support table 2 rises by the distance corresponding to one plate, the rays of light are again cut off when one plate rises and stops. In this way, the support table 2 interruptedly rises by the distance corresponding to the thickness of one plate P whenever the separation suction disks 6 and 6 remove the plate P of the uppermost position and always pushes up the uppermost plate P to the predetermined height. Therefore, as the separation suction disks 6 and 6 repeat the up/down movement, they suck and separate one after another the plates, and the rotary suction disks 12 and 12 by the revolution of the rotary bodies 13 and 13 serially conducts suction-transfer, conveying and supply of the separated plates P' in synchronism with the suction-separating operation.

According to the invention described above, the separation suction disks 6 independently moving up and down are disposed separately from the rotary bodies 13. Therefore, the separation suction disks 6 are allowed to adsorb and separate the uppermost plate of the stacked plate assembly A1 of the plates stacked in the horizontal state. Next, when the rotary suction disk 12 of each rotary body 13 rotates and comes to the position adjacent to the separation suction disk 6, the suction force imparted by the suction releasing mechanism 25 removes the separated plate P' from the separation suction disk 6 and conveys it. When the rotary suction disk 12 rotates half way, the suction force is automatically released. Consequently, the separated plate P' falls off from the rotary suction disk 12 and the pair of conveying-supplying belts 17a and 17a of the conveying-supplying mechanism 19 wound on the rotary bodies 13 can smoothly and rapidly convey and supply the plate P' to the next process step.

According to a test example of a high-speed stable process carried out by using the apparatus of the invention, the apparatus can separate, convey and supply at least 150 plates per minute (shot number). The prior art apparatus described in Japanese Patent Laid-Open No. 286515/1992 can attain only 100 shots even at the maximum speed of the rotary belts.

When the apparatus according to the prior art is intermittently rotated and sucks and separates the plates at the stop, the number of shots is at most 100 shots. When the suction disks are allowed to suck and separate the plates while the apparatus rotates continuously, suction and separation of the plates become difficult, and the number of shots further drops when the rotating speed is lowered to a considerable extent.

As described above, the apparatus according to the invention can highly efficiently carry out the continuous operation of separating, one by one, the plates from the stacked plate assembly A1 for separation on the support table 2 of the elevation mechanism 1 and can convey and supply the plates to the next step. However, it is preferred to mechanically supply one after another a desired number of new stacked plate assemblies without interrupting this plate separating-supplying operation.

The invention satisfies the requirement described above by employing the following construction.

In other words, the apparatus described above includes a supplying-conveying mechanism 36 for conveying a standby stacked plate assembly A2 having a large number of plates stacked under the horizontal state to the position of the support table 2 of the elevation mechanism 1 lowered, a relay reciprocating mechanism 38 for driving a horizontal reception member 37 supporting the residual stacked plate assembly A1' from the lower surface in such a fashion as to be capable of moving back and forth when the number of residual plates of the stacked plate assembly 1 for separation becomes small, and disposed on the side of the stacked plate assembly A1 for separation, and a relay elevating mechanism 39 for driving the relay reciprocating mechanism 38 in such a fashion as to be capable of moving up and down. When the number of residual stacked plates becomes small in the stacked plate assembly A1 for separation, the horizontal reception member 37 is caused to advance. While the horizontal reception member 37 supports the residual stacked plate assembly A1' from its lower surface, the support table 2 of the elevation mechanism 1 is once lowered below the conveyor belts 3c and 3c of the supplying-conveying mechanism 36, the support table 2 is again raised to support the stacked plate assembly A2 that is supplied from the supplying-conveying mechanism 36, and is then brought into conformity with the lower surface of the residual stacked plate assembly A1'. When such an operation is repeated, a desired number of stacked plate assemblies A2, A3, and A4 for supplementation are put together and the plate separating-supplying operation can be consecutively carried out.

The apparatus according to the invention will be explained in further detail with reference to the accompanying drawings.

Figure 6:
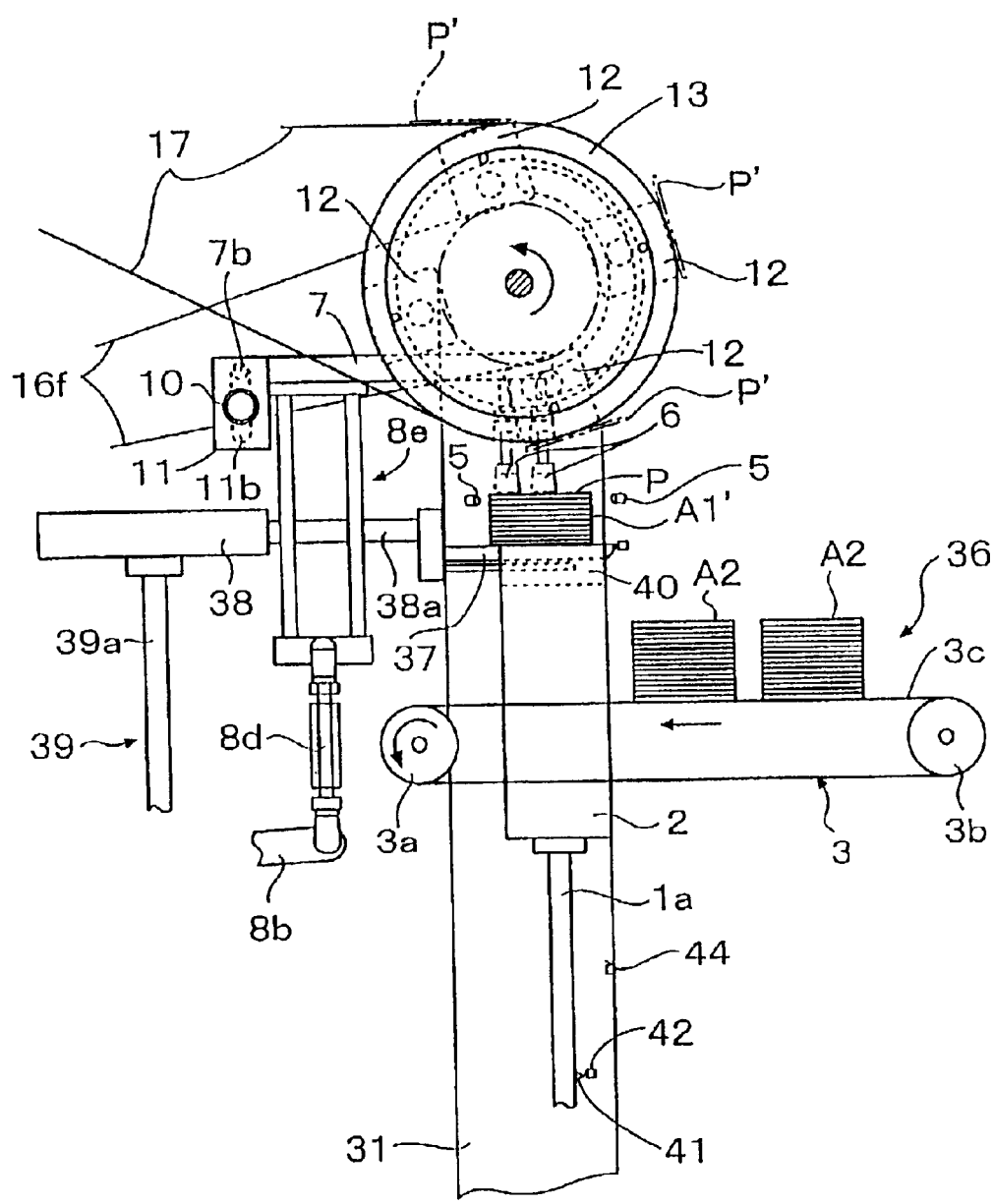
FIG. 6 is a side view showing a relay operation state by a horizontal acceptance member of the relay- reciprocating mechanism.

As shown in FIG. 1, at least one lot of standby stacked plate assembly A2 including a large number of plates stacked in advance under the horizontal state in front of the elevation mechanism 1 is put on the stacked plate assembly conveying mechanism 3 as the supplying-conveying mechanism 36. On the other hand, the stacked plate assembly A1 for separation, that includes a desired number of plates on the support table 2 of the elevation mechanism 1, is raised to the predetermined position for conducting the plate separating operation as shown in the drawing. The horizontal reception member 37 extending in the longitudinal direction while penetrating through the frame-like space of the frame-like connection member 8e as shown in FIG. 6 is arranged below the blast rod 7 moving up and down, and is disposed at the distal end of the piston rod 38a of the relay reciprocating mechanism 38 constituted by the air cylinder in such a fashion as to be capable of moving back and forth. The horizontal reception member 37 can support the lower surface of the stacked plate assembly A1' for separation of the number of residual plates which has become small, in the advanced state, as shown in FIG. 6. As clearly shown in FIGS. 6 and 7, two elongated horizontal plates are arranged in the transverse direction with a gap between them to constitute the horizontal reception member 37 so that they can stably support the plates.

On the other hand, two concave grooves 40 and 40 extending in the longitudinal direction are formed on the upper surface of the support table 2 of the elevation mechanism 1 as clearly shown in FIG. 2 so that under the state where the support table 2 supports the stacked plate assembly A1' for separation the number of residual plates of which has become small, the grooves 40 and 40 respectively receive the two horizontal reception member 37 and 37 that advance so as to succeed this supporting operation by the support table 2.

The relay elevation mechanism 39 described above is driven by the stepping motor (not shown) and its relay elevation rod 39a is connected to the lower surface of the cylinder portion 38b of the relay reciprocating mechanism 38 described above to drive the relay elevation mechanism 39 for elevation. When the horizontal reception members 37 and 37 advance and support the residual stacked plate assembly A1', the relay elevation rod 39a interrupted receives the signals of the optical sensors 5 and intermittently elevates one plate.

The operation of the apparatus of the invention is subjected to sequence control by means of a sequence circuit (not shown) while all the limit switches confirm the existence of the operation.

Figure 7:
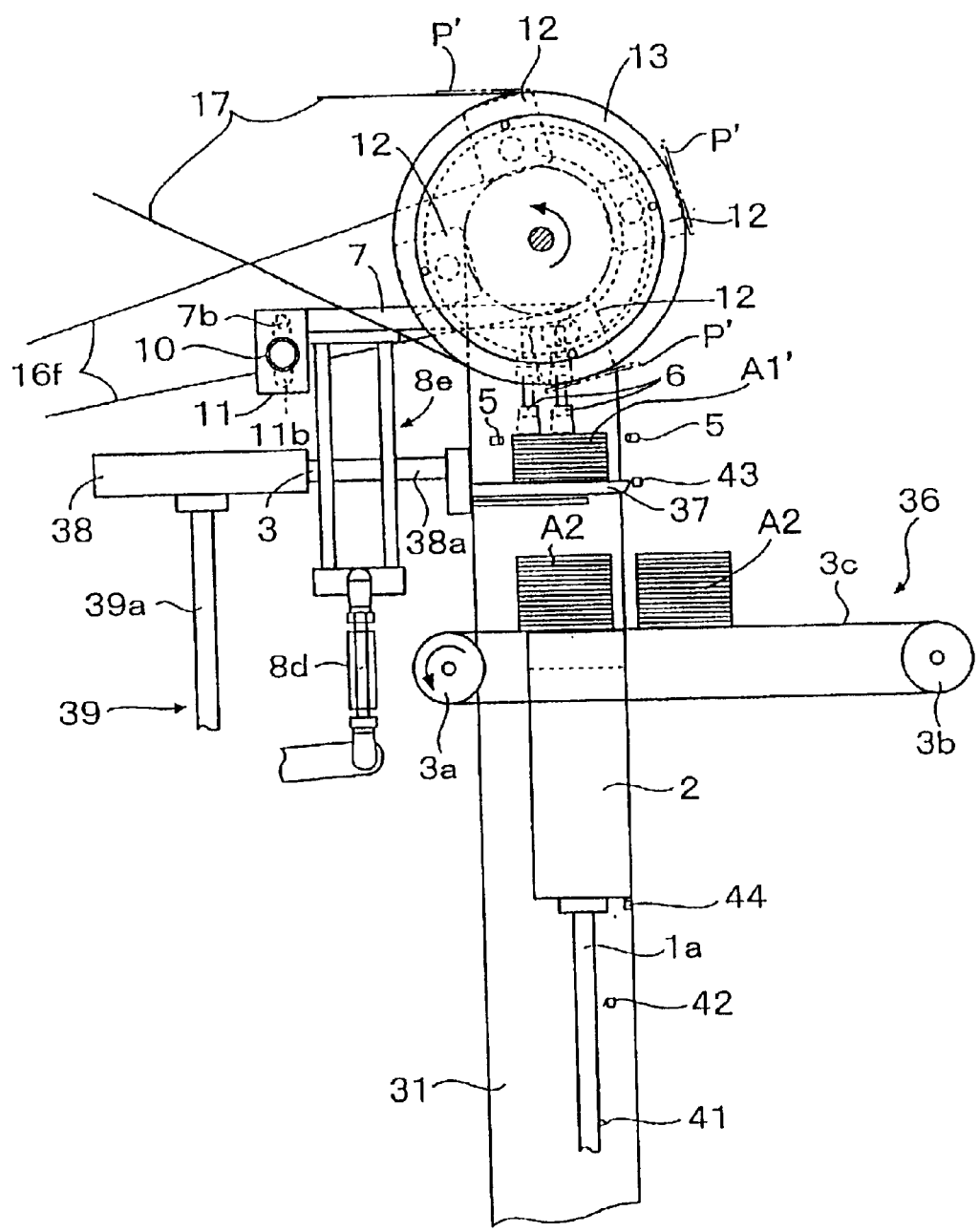
FIG. 7 is a side view showing a supplementation state of a standby stacked plate assembly.

In other words, the separation suction disks 6 and 6 repeat the up/down movement, the uppermost plate P of the stacked plate assembly A1 is separated, one by one, as the support table 2 of the elevation mechanism 1 elevates and when the support table 2 rises up to the predetermined position where the number of residual plates is small on the support table 2, a protuberance 41 provided in advance to the side surface of the elevation rod 1a comes into contact with a limit switch 42 disposed in advance at a predetermined height and turns ON the limit switch 42. The signal of this limit switch 42 activates the relay reciprocating mechanism 38 to advance its horizontal reception members 37 and 37. As clearly shown in FIG. 7, the horizontal reception members 37 and 37 relay and support the residual stacked plate assembly A1' while being fitted into the grooves 40 and 40 of the upper surface of the support table 2 at the up position. When these horizontal reception members 37 and 37 advance and the distal end of either one of them comes into contact with, and turns ON, the limit switch 43, driving of the relay reciprocating mechanism 38 is stopped and at the same time, the relay elevation rod 39a of the relay elevation mechanism 39 starts operating and raises the residual stacked plate assembly A1', one stage by one, while receiving the signals from the optical sensors 5 and 5. Therefore, the plates of the residual stacked plate assembly A1' are consecutively separated, one by one, through repetition of the up/down movement of the separation suction disks 6 and 6. On the other hand, simultaneously with such a relay, the elevation rod 1a of the elevation mechanism 1 lowers and when the support table 2 lowers below the conveyor belt 3c of the supplying-conveying mechanism 36, the lower end of the support table 2 comes into touch with the limit switch 44 that is positioned in advance at a predetermined position below the endless annular conveyor belt 3c, and turns ON the limit switch 44. The signals activate the supplying-conveying mechanism 36 to drive its conveyor belt 3c in the direction indicated by arrow and to convey the standby stacked plate assembly A2 to a predetermined position above the lowered support table 2 as shown in FIG. 7.

When the standby stacked plate assembly A2 is conveyed to the predetermined position, the stacked plate assembly A2 comes into contact with the limit switch 45 arranged in advance on the side of this assembly A2 and turns it ON. The signal of the limit switch 45 elevates the elevation rod 1a of the elevation mechanism 1, and the support table 2 supports and elevates the standby stacked plate assembly A2 with the rise of the elevation rod 1a and joins the lower surface of the residual stacked plate assembly A1'. In other words, the supply of a new stacked plate assembly is completed. Thereafter, the support table 2 again starts the supporting and elevating operation of the whole stacked plate assembly A1 for separation joined with the support table 2. In this way, the separation suction disks 6 and 6 repeat the separation of the plates without interruption.

Simultaneously with the joining operation described above, the upper end face of the standby stacked plate assembly A2 comes into contact with a longitudinal limit switch 46 positioned in the proximity of the lower surface of the horizontal reception member 37 and extending in the horizontal direction and turns ON this limit switch 46. The signal of this limit switch 46 moves back the relay reciprocating mechanism 38 to its original position and removes it from the lower surface of the residual stacked plate assembly A1'. Therefore, the standby stacked plate assembly A2 joins with the entire lower surface, and the stacked plate assembly A1 for separation supplied can be obtained on the support table 2.

Incidentally, reference numeral 47 denotes a metal casing that accommodates the sequential circuit for sequence control of the limit switch 46 and has the two horizontal reception members 37 and 37 fixed to the outer surface thereof.

When the number of residual plates of the stacked plate assembly A1 for separation supplied becomes small, the relay-supplying operation described above is conducted and the next standby stacked plate assembly A2 is supplied while the separating operation by the repetition of the up/down movement of the separation suction disks 6 and 6 and the conveying-supplying operation of the rotary disks are not interrupted. Consequently, a desired number of lots of standby stacked plate assemblies A2, A2, . . . are supplied one after another. In other words, the apparatus of the invention can conduct the separating-conveying operation of the stacked plate assemblies without interruption.

As is obvious from the explanation given above, according to the inventions of claims 1 and 2, the rotary bodies each equipped with the separation suction disks and the rotary suction disks are separately arranged adjacent to each other, and the blast rod equipped with the separation suction disks is caused by the separation mechanism to repeat the up/down movement. Consequently, the uppermost plates of the stacked plate assembly having a large number of plates stacked under the horizontal state are sucked and separated one after another on the support table of the elevation mechanism, and the separated plates sucked and held by the separation suction disks are serially sucked and removed by the sucking operation imparted from the suction-releasing mechanism to each rotary suction disk provided to the rotary member rotating. Next, when the sucking operation is cut off during the conveying process by the revolution of the rotary body, each rotary suction disk releases the separated plate. When the rotary body further rotates, the conveying-supplying mechanism conveys and supplies one by one the plates so released to the next step. Therefore, it becomes possible to separate and supply smoothly, quickly and highly efficiently the plates from the stacked plate assembly without stopping once the rotary bodies when the separation suction disks suck and separate the plate from the stacked plate assembly.

According to the inventions of claims 3 and 4, the horizontal reception members of the relay-reciprocating mechanism support the residual stacked plate assembly in place of the support table of the elevation mechanism when the number of plates of the stacked plate assembly for separation on the support table of the elevation mechanism becomes small during the operation described above. Therefore, it is possible to lower once and to supplement the elevation rod of the elevation mechanism in the interim, then to supplement the standby stacked plate assembly to the support table by the conveying-supplementing mechanism, and after the standby stacked plate assembly is supplemented to the support table, to raise the elevation rod to join with the residual stacked plate assembly. Therefore, these inventions can eliminate the plate supplementing operation according to the prior art that has been carried out manually and has been troublesome and inefficient, and a desired number of lots of standby stacked plate assemblies can be supplemented smoothly and quickly.

What is claimed is:

1. An apparatus for separating and supplying plates from a stacked plate assembly, comprising:

an elevation mechanism having a support table to support a stacked plate assembly for separation having a large number of plates stacked in a horizontal state from a lower surface;

separation suction disks arranged above said elevation mechanism, for sucking and holding the uppermost plate of said stacked plate assembly for separation supported by said support table of said elevation mechanism;

a separation mechanism to move up and down a blast rod having said separation suction disks;

rotary bodies positioned on the side of said separation suction disks and having rotary suction disks arranged on a circumference with predetermined gaps;

a suction releasing mechanism to impart a suction operation for sucking and removing a separated plate from said separation suction disks and a releasing operation to cut off said suction operation and release said separated plate through blast holes formed in said rotary bodies; and a conveying-supplying mechanism to convey and supply said separated plate so released to a next step.

2. An apparatus for separating and supplying plates from a stacked plate assembly according to claim 1, which further comprises a conveying-supplying mechanism for conveying a standby stacked plate assembly having a large number of plates stacked in a horizontal state to a position on said support table of said elevation mechanism that is lowered, a relay reciprocating mechanism for moving back and forth horizontal reception members for supporting a residual stacked plate assembly from a lower surface when the number of residual plates of said stacked plate assembly for separation becomes relatively small, disposed on the side of said stacked plate assembly for separation supported on said support table of said elevation mechanism, and a relay elevation mechanism for moving up and down said relay reciprocating mechanism, and wherein said horizontal reception members are allowed to advance and to support said residual stacked plate assembly from the lower surface at a stage where the number of said stacked plates of said stacked plate assembly for separation becomes small and in the interim, wherein said support table of said elevation mechanism is once lowered below a conveyor belt of said conveying-supplying mechanism, is again moved up to support a stacked plate assembly to be supplemented by said supplementing-conveying mechanism above said support table, and is further moved up to join with the lower surface of said residual stacked plate assembly.

3. A method for separating and supplying plates from a stacked plate assembly, comprising:

sucking and separating upwards the uppermost plate of a stacked plate assembly having a large number of plates stacked horizontally to the uppermost plate;

sucking and removing said plate so separated using rotary suction disks;

releasing said plate from said suction disks; and conveying and supplying said plate to a next process step.

4. A method for separating and supplying plates from a stacked plate assembly according to claim 3, further comprising:

supplementing from below said stacked plate assembly for separation a new stacked plate assembly for separation when the residual number of said plates of said stacked plate assembly for separation becomes a predetermined amount.

* * * * *